United States Patent Office 3,776,806
Patented Dec. 4, 1973

3,776,806
FILAMENT COMPRISING A POLYMER BLEND OF POLYESTER AND POLYAMIDE CONTAINING AN ORGANIC PHOSPHORUS COMPOUND
Richard E. Mayer, Amnon Birenzvige, and Gene C. Weedon, Richmond, Va., assignors to Allied Chemical Corporation, New York, N.Y.
No Drawing. Application Mar. 10, 1971, Ser. No. 123,008, now Patent No. 3,692,867, which is a continuation of abandoned application Ser. No. 752,789, Aug. 15, 1968. Divided and this application May 24, 1972, Ser. No. 256,227
Int. Cl. C08g 41/04
U.S. Cl. 161—88    4 Claims

ABSTRACT OF THE DISCLOSURE

A process for increasing the whiteness of a filament extruded from a polymer blend comprised of polyester and polyamide which comprises incorporating in the polymer blend prior to extrusion thereof a small amount of an organic phosphorus compound which can be an organic phosphite, phosphinate, phosphate, polymeric phosphite, polymeric phosphate, the corresponding acid, or mixtures thereof.

BACKGROUND OF THE INVENTION

This is a division of application Ser. No. 123,008, filed Mar. 10, 1971, now U.S. Pat. No. 3,692,867, which is a continuation of Ser. No. 752,789, filed Aug. 15, 1968, and now abandoned.

This invention relates to a filament having increased whiteness. More particularly this invention relates to a process for increasing the whiteness of a filament comprising a polymer blend of polyamide and polyester using an organic phosphorus compound which can be an organic phosphite, phosphinate, phosphate, polymeric phosphite, polymeric phosphate, the corresponding acid, or mixtures thereof.

Carpets and fabrics made from fibers comprising a polyamide matrix having polyester microfibers dispersed therein have generated considerable interest in the textile industry and their luxurious properties have made them desirable over carpets and fabrics made from other fibers. These fibers comprising a polyamide matrix having polyester microfibers dispersed therein have a possible disadvantage in that they are sometimes very yellowish in color as currently produced.

The apparel industry, for example, prefers a white fiber and pays a premium price for such a fiber; therefore, it is highly desirable for marketing and other reasons that these fibers be white.

SUMMARY OF THE INVENTION

It has now been found that the whiteness of a filament comprising a polymer blend of polyamide and polyester can be increased by incorporating in the polymer blend a small amount of an organic phosphorus compound such as an organic phosphite, phosphinate, phosphate, polymeric phosphite, polymeric phosphate, the corresponding acid, or mixtures thereof. In accordance with the present invention, the whiteness of a filament extruded from a polymer blend comprised of polyester and polyamide is increased by a process which comprises incorporating in the polymer blend prior to extrusion thereof a small amount of an organic phosphorus compound which can be of one having the general formulas:

(I) 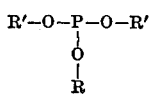

(II) 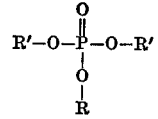

(III) 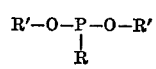

(IV) 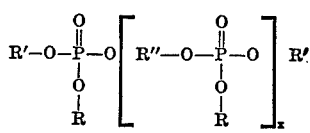

(V) 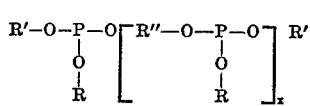

or mixtures thereof, wherein R can be aryl containing up to about 12 carbon atoms, alkyl containing up to about 25 carbon atoms, or aralkyl containing up to about 30 carbon atoms, R' can be hydrogen, aryl containing up to about 12 carbon atoms, alkyl containing up to about 25 carbon atoms, aralkyl containing up to about 30 carbon atoms, or an alkali metal, and R'' can be a divalent aliphatic or aromatic radical containing up to about 12 carbon atoms, and X can be an integer from 1 to about 25. In a preferred embodiment of the present invention the filament comprises a polyamide matrix having polyester microfibers dispersed therein.

The filaments produced in accordance with the present invention can be prepared from blends of polyester and polyamide such as disclosed in U.S. Pat. 3,369,057 to Twilley. In addition, biconstituent filaments spun from other blends of polyester and polyamide are satisfactory for purposes of this invention, including those disclosed in U.S. Pats. 3,378,055, 3,378,056, 3,378,602 and 3,382,305; British Pat. 1,097,068; Belgian Pat. 702,813; and Netherlands Pat. 6606838 and 6612628.

In the filaments produced in accordance with the preferred embodiment of the present invention, the polyester ingredient is dispersed as discrete microfibers throughout the polyamide which forms a continuous phase or matrix. The polyester microfibers have average diameter not above 1 micron and preferably not above 0.5 micron. In length the microfibers vary widely, but substantially all are elongated. The microfibers may be continuous or discontinuous within the matrix. On the average they are at least 5 times and usually at least 20 times longer than the average diameter, typically averaging in length about 250 times their average diameter. In the filaments, the microfibers lie predominantly in the direction of the filament axis. The dispersion of microfibers in the filament is substantially uniform, both lengthwise and across each filament. Typically at least 100 microfibers traverse each cross-section of each filament. The microfibers will generally have essentially round cross section, although their diameter may vary along their length and they may taper toward their ends as a result of the shears imposed during drawing.

The filaments produced in accordance with the preferred embodiment of the present invention comprise, per 100 parts by weight total polyamide and polyester, about 50 to 90 parts of the polyamide as the matrix and dispersed therein about 50 to 10 parts of the polyester.

Suitable polyamides for use in the present invention include, for example, those prepared by condensation of hexamethylene diamine and adipic acid, known as nylon 6—6 or by polymerization of e-caprolactam, known as nylon 6.

The polyesters useful in the practice of this invention can be prepared in general by condensation reactions between dicarboxylic acids or their derivatives and compounds containing two hydroxyl groups, or materials possessing both an alcohol group and a carboxylic acid group or derivative thereof; or by the condensation-polymerization of lactones. Dicarboxylic acid derivatives which can be employed include esters, salts, anhydrides and acid halides. The monomeric species employed in the preparation of the polyesters are preferably not more highly functional than difunctional in their reactivity so as to produce essentially linear, non-crosslinked polymer structures.

Suitable polyesters for use in the present invention include those polymers in which one of the recurring units in the polyester chain is the diacylaromatic radical from terephthalic acid, isophthalic acid, 5-t-butylisophthalic acid, a naphthalene dicarboxylic acid such as naphthalene 2,6 and 2,7 dicarboxylic acids, a diphenyldicarboxylic acid, a diphenyl ether dicarboxylic acid, a diphenyl alkylene dicarboxylic acid, a diphenyl sulphone dicarboxylic acid, an azo dibenzoic acid, a pyridine dicarboxylic acid, a quinoline dicarboxylic acid, and analogous aromatic species including the sulfonic acid analogues; diacyl radicals containing cyclopentane or cyclohexane rings between the acyl groups; and such radicals substituted in the ring, e.g., by alkyl or halo substituents.

The dioxy radical representing the other principal recurring unit in the polyester chain can be an open chain aliphatic such as ethylene glycol or ether thereof, for example, the diether, or can contain rings such as those which form part of the above noted diacyl radicals. The carboxy and/or the oxy chain members can be directly attached to a ring or removed by one or more carbons therefrom, as in the 1,4 dioxymethyl cyclohexane radical.

The organic phosphorus compound can be an organic phosphite, phosphinate, phosphate, polymeric phosphite, polymeric phosphate, the corresponding acid, or mixtures thereof having the general formulas as previously described.

Generally speaking, 0.1 to 5.0 weight percent of the organic phosphorus compound based upon the weight of the polyamide and polyester will produce the desired whitening of the filament, however, it is preferred that 0.1 to 1.0 weight percent be used. The organic phosphorus compound contains at least one aryl, alkyl, or aralkyl group and the preferred group is aryl such as phenyl. Other suitable aryls include, for example, phenyl, 1-naphthyl, 2-naphthyl, biphenyl, anthracyl, phenanthyl, and the like. Suitable alkyls include, for example, methyl, ethyl, n-propyl, isopropyl, tert butyl, decyl, hexadecyl, cyclohexyl, and the like. Suitable aralkyls include, for example, nonylphenyl, benzyl, tolyl and the like. Suitable divalent aliphatic or aromatic radicals include, for example, ethylene, propylene, butylene, phenylene, and the like. When the organic phosphorus compound used is an alkali metal phosphite, phosphinate, phosphate, polymeric phosphite, or polymeric phosphate, the alkali metal is preferably sodium and more preferably disodium such as disodium phenyl phosphinate, however, other suitable alkali metals include those of lithium and potassium. Suitable organic phosphites, phosphinates, phosphates, polymeric phosphites, polymeric phosphates, and their corresponding acids useful in this invention include, for example, triphenyl phosphite, didecyl phenyl phosphite, diethyl phenyl phosphite, phosphinic acid, disodium phenylphosphinate, disodium phenyl phosphate, sodium diphenyl phosphate, sodium diethyl phosphate, tris(4-nonyl) phenyl phosphite, trihexadecylphosphate, triphenylphosphate, tribenzylphosphate, trilauryl phosphite, triethyl phosphite, poly(ethylene butyl phosphite), poly(ethylene phenyl phosphate), and the like.

The organic phosphorus compound can be incorporated into either the polyamide or polyester or both during the respective polymerizations or can be dry blended with the polyamide and polyester granules prior to the melting of the blend of polymers by conventional addition and dry mixing procedures. The organic phosphorus compound can also be incorporated into the molten blend of polymers by, for example, injection into the mixing portion of the extruder during the melt extrusion of the filament.

The filament produced in accordance with the present invention can be processed into conventional knitted, woven, or non-woven fabric. If desired, the filaments comprising these fabrics can be fused together in accordance with the method described in U.S. application Ser. No. 727,327, filed May 7, 1968, now U.S. Pat. No. 3,616,149, to produce dimensionally stable fabrics which retain their original fabric-like appearance. For example, when employing an oven, durations as short as about 15–20 seconds at about 230° C. have been found effective for at least partial fusion when a softer fabric is desired. Fusion times of up to about 10 minutes and longer at about 255° C. can be employed, however, the breaking strength of the fabric is reduced somewhat.

PREFERRED EMBODIMENTS

The following examples illustrate the practice and principles of the present invention and a mode of carrying out the invention.

EXAMPLE 1

Synthetic multifilament yarns were produced in accordance with the procedure used in Example 1 of U.S. Pat. 3,369,057 to Twilley. Granular polyethylene terephthalate polymer was used, melting about 255° C. (DTA) and about 265° C. (optical), having a density (when amorphous) of about 1.33 grams per cc. at 23° C. and about 1.38 grams per cc. in the form of drawn filament, having a reduced viscosity of about 0.85 and having a $T_g$ of about 65° C. The polyester in the form of drawn filament drawn to give ultimate elongation not above 20 percent will have a tensile modulus (modulus of elasticity) ranging from about 70 to about 140 grams per denier, depending on the extrusion conditions employed.

Mixtures were prepared comprising 30 parts of granular polyester mixed with 70 parts of granular nylon 6 (polycaproamide) having a reduced viscosity of about 1.04 a $T_g$ of about 35° C., and a density of about 1.14 grams per cc. at 23° C. The amine groups in the nylon 6 (polycaproamide) were blocked by reaction with sebacic acid, bringing the amine group analyses thereof to 11 milliequivalents of $NH_2$ groups per kilogram of polymer. The nylon 6 (polycarproamide) contained, as a heat stabilizer, 50 p.p.m. copper as cupric acetate. Various amounts of triphenyl phosphite were dry blended with the mixtures of polyamide and polyester granules.

The mixtures of polyamide and polyester granules and triphenyl phosphite were blended in a double cone blender for 1 hour. The granular blends were dried to a moisture content of no more than 0.01 percent; then melted at 285° C. in a 3½-inch diameter screw extruder operated at a rotational speed of about 39 r.p.m. to produce a pressure of 3000 p.s.i.g. at the outlet. A dry nitrogen atmosphere was used to protect the blends against absorbing moisture. Residence time in the extruder was 8 minutes.

The molten mixtures thereby obtained had melt viscosities of about 2000 poises at 285° C. The polyester was uniformly dispersed throughout each mixture and had an average particle diameter of about 2 microns, as observed by cooling and solidifying a sample of the melt, leaching out the polyamide component with formic acid, and examining the residual polyester material.

The molten mixtures thereby obtained were extruded through a spinneret plate having 14 orifices of circular cross section, and the resulting fibers were drawn and wound, the final yarn deniers generally being about 63. The polyethylene terephthalate microfibers had an average diameter not above 1 micron and had an average length at least 20 times their average diameter. The microfibers lay predominantly in the direction of the filament axis. The properties of the multifilament yarns produced in this example are contained in Table I below. The yarns containing triphenyl phosphite were white whereas the control containing no triphenyl phosphite was yellow.

TABLE I

| Organic phosphite | Control | Triphenyl phosphite | |
|---|---|---|---|
| Weight percent organic phosphite based on total polyester and polyamide | None | 0.1 | 0.25 |
| Ultimate elongation (UE), percent | 31.8 | 36.1 | 31.9 |
| Ultimate tensile strength (UTS), gms. per denier | 3.7 | 4.2 | 4.0 |
| Breaking strength, gms | 234 | 254 | 252 |
| Breaking strength retention aged 100 hours in Atlas Fadeometer, percent: | | | |
| Carbon arc | 63 | 60 | 60 |
| Xenon arc | 63 | 70 | 58 |
| Denier | 63 | 70 | 63 |
| Visual appearance | (1) | White | White |
| Yellow Index 2 | 122.7 | 114.4 | 115.3 |

1 Very yellowish.
2 Measured on a Reflectance Colorimeter. The reflectance was measured at 420, 530, and 576 millimicrons. The Yellow Index was then calculated in a conventional manner common to the art.

EXAMPLE 2

Synthetic multifilament yarns were produced in the same manner as in Example 1 of the present invention. Triphenyl phosphite and tris(4-nonyl)phenyl phosphite were evaluated. The yarns containing triphenyl phosphite and trinonylphenyl phosphite were white whereas the controls containing no organic phosphorus compound were yellow. Results are contained in Table II below.

TABLE II

| Organic phosphite | Control | Triphenyl phosphite | Tris(4-nonyl)phenyl phosphite |
|---|---|---|---|
| Weight percent organic phosphite based on total polyester and polyamide | None | 0.3 | 0.25 |
| Denier | 63 | 61 | 77 |
| Visual appearance | (1) | White | White |
| Yellow Index 2 | 125 | 117 | |

1 Very yellowish.
2 See footnote 2, Table I.

EXAMPLE 3

Synthetic multifilament yarns were produced in the same manner as in Example 1 of the present invention. Disodium phenyl phosphinate was evaluated. The yarns containing disodium phenyl phosphinate were white whereas the controls containing no disodium phenyl phosphinate were yellow. Results are contained in Table III below.

TABLE III

| Organic phosphinate | Control | | Disodium phenyl phosphinate | |
|---|---|---|---|---|
| Weight percent organic phosphinate based on total polyester and polyamide | None | None | 0.5 | 0.3 |
| Denier | 63 | 64 | 65 | 74 |
| Visual appearance | Very | yellowish | White | White |
| Yellow Index 1 | 125 | 125 | 118 | 118 |

See footnote 2, Table I.

EXAMPLE 4

Synthetic multifilament yarns were produced in the same manner as in Example 1 of the present invention. Triphenyl phosphate was evaluated. The yarn containing triphenyl phosphate was white whereas the control containing no triphenyl phosphate was yellow. Results are contained in Table IV below.

TABLE IV

| Organic phosphate | Control | Triphenyl phosphate |
|---|---|---|
| Weight percent organic phosphate based on total polyester and polyamide | None | 0.3 |
| Ultimate elongation (UE); percent | 31.5 | 20.4 |
| Ultimate tensile strength (UTS), gms. per denier | 3.7 | 4.7 |
| Breaking strength, gms | 239 | 279 |
| Breaking strength retention aged 100 hours in Atlas Fadeometer, percent—Xenon arc | 84 | 76 |
| Denier | 64 | 60 |
| Visual appearance | (1) | White |
| Yellow index 2 | 125 | 117 |

1 Very yellowish.
2 See footnote 2, Table I.

EXAMPLE 5

The synthetic multifilament yarn produced in Example 1 containing triphenyl phosphite and a control yarn containing no triphenyl phosphite produced in the same manner were woven into plain weave fabrics having 19 picks per inch in both the warp and fill directions. The yarns each contained 14 filaments and were drawn at a draw ratio of about 3.0× to a final denier of about 63. Thirteen ends of the yarn of Example 1 were plied to obtain a plied yarn of about 840 denier prior to weaving. The fabrics were bonded by fusing them on a tenter frame at 30 percent overfeed for 3 minutes at 250° C. in accordance with the method described in U.S. application Ser. No. 727,327, filed May 7, 1968. The fused fabric containing triphenyl phosphite was only yellowed whereas the control containing no triphenyl phosphite was brown. Results are contained in Table V below.

TABLE V

| Organic phosphite | Control | Triphenyl phosphite |
|---|---|---|
| Weight percent organic phosphite based on total polyester and polyamide | None | 0.25 |
| Denier | 63 | 63 |
| Visual appearance | (1) | Yellowed |
| Yellow index 2 | 138.1 | 126.9 |

1 Brown.
2 See footnote 2, Table I.

What is claimed is:

1. A fabric consisting of filaments fused together to produce a dimensionally stable fabric wherein said filaments consist of a polymer blend of about 50 to 10 parts of polyester microfibers dispersed in about 50 to 90 parts of a polyamide matrix, per 100 parts by weight total polyamide and polyester, said polymer blend containing about 0.1 to 5.0 weight percent, based on the weight of the polyamide and polyester, of an organic phosphorus compound selected from the group having the general formulas:

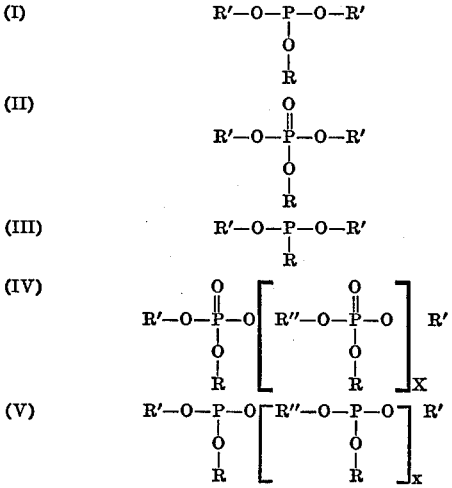

and mixtures, thereof, wherein R is selected from the group consisting of aryl containing up to about 12 carbon atoms, alkyl containing up to about 25 carbon atoms, and aralkyl containing up to about 30 carbon atoms, R' is selected from the group consisting of hydrogen, aryl containing up to about 12 carbon atoms, alkyl containing up to about 25 carbon atoms, aralkyl containing up to about 30 carbon atoms, and an alkali metal, R" is a divalent radical containing up to about 12 carbon atoms selected from the group consisting of aliphatic and aromatic, and X is an integer from 1 to about 25.

2. A fabric consisting of filaments fused together to produce a dimensionally stable fabric wherein said filaments consist of a polymer blend of about 50 to 10 parts of polyester microfibers dispersed in about 50 to 90 parts of a polyamide matrix, per 100 parts by weight total polyamide and polyester, said polymer blend containing about 0.1 to 5.0 weight percent, based on the weight of the polyamide and polyester, of triphenyl phosphite, whereby the original fabric-like appearance is retained and the fabric has increased whiteness.

3. The fabric of claim 2 wherein the polyamide is polycaproamide.

4. The fabric of claim 2 wherein the polyester is polyethylene terephthalate.

References Cited

UNITED STATES PATENTS

| | | | |
|---|---|---|---|
| 3,369,057 | 3/1968 | Twilley | 260—857 |
| 3,378,055 | 4/1968 | Robertson | 260—857 |
| 3,382,305 | 5/1968 | Breen | 260—857 |
| 2,521,055 | 9/1950 | Foster | 161—88 |

GEORGE F. LESMES, Primary Examiner

J. J. BELL, Assistant Examiner

U.S. Cl. X.R.

160—89, 150, 169, 170; 260—45.7 P, 75 R, 78 R, 857 PE